United States Patent Office 3,067,096
Patented Dec. 4, 1962

3,067,096
ANTHELMINTIC COMPOSITION AND METHOD OF DESTROYING ANIMAL PARASITES UTILIZING SAID COMPOSITION
James C. Trace and George T. Edds, Fort Dodge, Iowa, assignors to American Home Products Corporation, New York, N.Y., a corporation of Delaware
No Drawing. Filed Jan. 26, 1961, Ser. No. 84,983
16 Claims. (Cl. 167—53)

This invention relates to anthelmintic compositions suitable for use in the removing of internal parasites from animals, and to a method of treating animals in order to remove helminths therefrom wherein these compositions are utilized as the active treatment agent.

The fundamental problem in the therapeutic control of animal parasites is to find and properly use drugs which are more toxic to the parasites than to their hosts. Since the protoplasm of the parasite, in many respects, is not far different from that of its host it is difficult to find drugs which are toxic to the parasite and not to its host. This invention involves in part an anthelmintic composition which, in use, contains an antidote to protect the host, which antidote functions in an unexpected manner to protect the host animal against the toxic action of the parasiticidal agent, without adversely affecting the anthelmintic activity of the composition on the parasites.

One of the organic phosphate chemicals which has previously been used as an agricultural chemical, principally as a fly bait, and which has been topically applied against parasites, is the organic phosphate known as Bayer L13/59 and also as "Dylox." This compound, which is described and claimed in Lorenz Patent No. 2,701,225, is a phosphonic ester having marked toxic properties.

The compound may be represented by the formula:

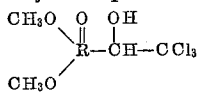

Chemically it may be referred to as $\beta,\beta,\beta$-trichloro-$\alpha$-hydroxy-ethylphosphonic dimethyl ester. Using a different system of nomenclature this compound may also be named O,O-dimethyl-2,2,2-trichloro-1-hydroxyethylphosphonate, and it is this latter term which will be used herein in describing this active toxic organic phosphate.

Organic phosphorus compounds, including O,O-dimethyl-2,2,2-trichloro-1 - hydroxyethyl phosphonate, because of their toxic properties and value as insecticides, have been considered from time to time as of potential use in veterinary parasiticidal compositions. Administration of O,O-dimethyl-2,2,2-trichloro-1-hydroxyethylphosphonate to animals, either orally, or by injection, for the purpose of removing parasites therefrom has, however, not been considered practical because of the extreme toxicity of the product. Since this toxicity factor develops when the chemical is used in heavy dosages, and since heavy dosages are usually required, the practicality of utilizing O,O-dimethyl-2,2,2-trichloro - 1 - hydroxyethyl phosphonate as a highly effective broad spectrum agent in a parasiticidal composition for the treatment of animals is seriously limited.

In experiments with the use of O,O-dimethyl-2,2,2-trichloro - 1 - hydroxyethylphosphonate as an anthelmintic agent we have found that its action can be greatly improved and effective removal of parasites secured if the dosage employed is from two to three times the safe dosage. Obviously, of course, O,O-dimethyl-2,2,2-trichloro-1-hydroxyethyl phosphonate cannot be utilized practically in such dosages without undue toxicity to the host animal with attendant unfortunate results.

The organic phosphates such as O,O-dimethyl-2,2,2-trichloro-1-hydroxyethylphosphonate are believed to exert their anthelmintic activity through cholinergic action on the enzyme system of the parasites. Since the host animal is also adversely affected by effective dosages of the chemical, however, the potential usefulness of the organic phosphates, including O,O-dimethyl-2,2,2-trichloro-1-hydroxyethylphosphonate, in highly effective, broad spectrum veterinary vermicides has never been realized practically.

As a means of permitting the practical use of this potentially hazardous drug, O,O-dimethyl-2,2,2-trichloro-1-hydroxyethylphosphonate, as an anthelmintic agent in animals, it has occurred to us that it might be possible to administer the organic phosphate along with an anticholinergic. Among available anticholinergics we selected atropine for antidotal action against the organic phosphates in general and O,O-dimethyl-2,2,2-trichloro-1-hydroxyethylphosphate in particular. Based on theoretical considerations, however, the use of atropine simultaneously with O,O-dimethyl-2,2,2-trichloro-1-hydroxyethylphosphate did not appear practical, since an anticholinergic, such as atropine, might have the simultaneous effect of protecting the parasite as well as the host animal against the cholinergic action of an organic phosphate. This would result in destroying whatever effectiveness O,O-dimethyl-2,2,2-trichloro-1 - hydroxyethylphosphonate might have as an anthelmintic, therefore rendering it practically ineffective against the animal parasites. Anticholinergics and cholinergics, combined, could be expected to be chemically or physiologically incompatible.

In view of these considerations it was therefore not to be expected that the use of an anticholinergic, such as atropine, and O,O-dimethyl-2,2,2-trichloro - 1 - hydroxyethylphosphonate together, the anthelmintic activity of the organic phosphate being thereby utilized, would be successful. Such physiological incompatibility and destruction of anthelmintic effectiveness would be expected to follow whether the two agents O,O-dimethyl-2,2,2-trichloro-1-hydroxyethylphosphonate and the anticholinergic, were administered separately, as by injection, or whether the two were formulated in a single pharmaceutical preparation. It was thought that if the host were protected by the presence of the anticholinergic the parasite would also be protected, thus rendering the combination ineffective as a parasiticidal composition.

Surprisingly enough we have now found that when an anticholinergic such as atropine is present along with O,O-dimethyl-2,2,2-trichloro-1 - hydroxyethylphosphonate in an anthelmintic composition, such as one intended for administration to animals by injection, or when the anticholinergic, in particular atropine, is administered simultaneously, or substantially simultaneously, to animals infested with parasites along with the organic phosphate, usually by injection at the same or different sites, while the host animal is protected against the toxic effects of O,O-dimethyl-2,2,2-trichloro-1 - hydroxyethylphosphonate the effectiveness of the compound against the parasites is not impaired. In fact the effectiveness seems to be improved.

It is indeed surprising that anticholinergics, such as atropine, could be combined with a cholinergic such as the organic phosphate and still secure a product which, although its toxicity against the host animal is satisfactorily antidoted, is nevertheless effective in removing the parasites.

The discovery that the atropine would neutralize the adverse reaction seen in the host, but have no influence on the anthelmintic activity toward the parasite, was completely unexpected since, pharmacologically, this could not be expected to happen. It is evident that there is some other mechanism of action on the parasite which is different from that involved in the host animal, this difference in mechanism allowing the organic phosphate to be effective in the removal of the parasites without, however, adversely affecting the host animal, when atropine and the organic phosphate are administered together.

Our discovery therefore involves the administration to animals, as an anthelmintic composition, of the compound O,O - dimethyl - 2,2,2 - trichloro - 1 - hydroxyethylphosphonate, this compound being antidoted by the simultaneous administration of an anticholinergic. Among anticholinergics available, atropine, in any form, is most suitable for a number of reasons.

The atropine may be present as any suitable salt of atropine such, for example, as atropine sulfate. Among other salts of atropine which may be utilized as the anticholinergic in accordance with our invention we may specify salts such as atropine hydrobromide, atropine hydrochloride, the methylbromide, salicylate, valerate, and other salts of atropine as listed, for example, in The Merck Index, Seventh Edition, etc. While we prefer to utilize an atropine salt which is water-soluble, this is not necessarily essential where some other suitable solvent, other than water, for the atropine may be conveniently employed. Also, while the use of salt of atropine is convenient, atropine itself may be utilized.

When the anthelmintic composition is administered to the animal by injection separate simultaneous injections of O,O-dimethyl-2,2,2-trichloro-1-hydroxyethylphosphonate and of atropine may be given to the animal, the injections normally, but not necessarily, being introduced at a different site. Alternatively the atropine may be included along with O,O-dimethyl-2,2,2-trichloro-1-hydroxyethylphosphonate in a single solution, which may then be injected into the animal as an anthelmintic composition, thus necessitating only a single injection. The organic phosphate, O,O-dimethyl-2,2,2-trichloro-1-hydroxyethylphosphonate, containing atropine may also be administered orally to animals as an anthelmintic dose.

We have obtained very satisfactory results when treating animals such as cattle, sheep, swine, goats, dogs and cats in this manner, and the product has been demonstrated to be very useful as an anthelmintic agent in the treatment of domestic animals generally. The atropine has been found to have no significant influence on the anthelmintic activity of O,O-dimethyl-2,2,2-trichloro-1-hydroxyethylphosphonate, i.e., its effect in the removal of parasites, when the two are injected, either alone, or together, into infested animals. That the activity of O,O-dimethyl - 2,2,2 - trichloro - 1 - hydroxyethylphosphonate against the parasites remains substantially unimpaired, if in fact not improved, while the antidotal activity of the atropine remains fully effective as regards the host animal (but not as regards the parasite), thus permitting the administration of large dosages, as for example from two to three times the safe dosages, of O,O-dimethyl-2,2,2-trichloro-1-hydroxyethylphosphonate without adverse toxicity to the animal, is indeed remarkable and unexpected. It permits the practical utilization of O,O-dimethyl-2,2,2-trichloro-1-hydroxyethylphosphonate as an anthelmintic agent, thereby providing a parasiticide which is safe and effective.

When utilized as an anthelmintic in accordance with our invention the ratio of the dosage of atropine administered to the animal along with the organic phosphate to the dosage of O,O-dimethyl-2,2,2-trichloro-1-hydroxyethylphosphonate may vary to a considerable extent. We have found that while the ratio of atropine to the organic phosphate is not critical, very satisfactory results are secured when the atropine dosage, based on an atropine salt such as atropine sulfate, is one-fortieth (1/40); one-eightieth (1/80); or one-one-hundred-and-fiftieth (1/150) of the dosage of O,O-dimethyl-2,2,2-trichloro-1-hydroxyethylphosphonate. Under certain circumstances it may be desirable that the ratio of atropine to O,O-dimethyl-2,2,2-trichloro-1-hydroxyethylphosphonate be as little as one part, by weight, of atropine to 300 parts, by weight, of the organic phosphate. Under other circumstances, the ratio may be as high as one part, by weight, of atropine to 20 parts, by weight, of O,O-dimethyl-2,2,2-trichloro-1-hydroxyethylphosphonate. For practical purposes the range of ratios of atropine to the organic phosphate will range from one part in 20 parts to one part in 300 parts of the organic phosphate, all parts being by weight. Generally, the need for a higher ratio of atropine to O,O-dimethyl-2,2,2-trichloro-1-hydroxyethylphosphonate depends on the dosage of organic phosphate utilized, the species of animal being treated, and possibly, the feeding conditions employed.

The use of various ratios of atropine to O,O-dimethyl-2,2,2-trichloro-1-hydroxyethylphosphone with various animals at various dosage levels (for the organic phosphate) may be illustrated in the following table listing the results, i.e. the type of parasites removed.

TABLE I

| Animal Treated | Dosage of O,O-dimethyl-2,2,2-trichloro-1-hydroxyethylphosphonate milligrams per kilogram of animal body weight | Ratio, parts by weight atropine to O,O-dimethyl-2,2,2-trichloro-1-hydroxyethyl-phosphonate which gave optimum results | Parasites Removed |
| --- | --- | --- | --- |
| Dogs | 125 | 1:150 | Hookworms and Ascarids. |
| Dogs | 75 | 1:150 | Whipworms. |
| Cats | 100 | 1:40 | Hookworms and Ascarids. |
| Sheep | 100 | 1:60 | All nematodes and nose bots. |
| Cattle | 75 | 1:60 | All nematodes and grubs. |
| Swine | 100 | 1:80 | Nodular worms. |
| Swine | 50 | 1:80 | Ascarids and whipworms. |

When the organic phosphate and atropine are administered separately to animals in order to remove parasites we prefer to administer, preferably at different points on the animal, a solution of the organic phosphate in a suitable solvent as one injectable and a solution of the atropine salt in distilled water as the second injectable. These two solutions may be injected concurrently at different sites, or they may be injected within a relatively short time interval, one with respect to the other.

In one method of utilizing this toxic organic phosphate for removing internal parasites in accordance with our invention, there is administered to the animal a dose of O,O - dimethyl - 2,2,2 - trichloro - 1 - hydroxy - ethylphosphonate in amount sufficient to remove the parasites, said dose being, at the same time, toxic to said animal if not antidoted, and administering to said animal before toxic manifestations have set in to an undue extent an antidoting dose of an anticholinergic. This antidoting anticholinergic may be atropine or a soluble salt thereof.

In one aspect of our invention the dosage of O,O,O-dimethyl - 2,2,2 - trichloro - 1 - hydroxy - ethylphosphonate, in amount sufficient to remove the internal parasites, may be administered by injection. The anticholinergic, used as antidote, which may be atropine or a soluble salt thereof, may also be administered by injection, either separately, or included as one ingredient in the solution of O,O-dimethyl-2,2,2-trichloro-1-hydroxyethylphosponate which is injected.

When administered separately, separate solutions of O,O - dimethyl - 2,2,2 - trichloro - 1 - hydroxyethylphosphonate and of the anticholinergic being employed, the two administrations should occur within a relatively short time interval of each other.

The anticholinergic may be administered first, and then the O,O-dimethyl-2,2,2-trichloro-1-hydroxyethylphosphonate. Or, alternatively, the organic phosphate may be administered first, and then the anticholinergic.

Whether intended for injection or otherwise, and regardless of whether they contain both the O,O-dimethyl-2,2,2-trichloro-1-hydroxymethylphosphonate and the anticholinergic, or consist of each ingredient in solution separately, the pharmaceutical solutions are preferably sterilized before use.

It has been found that dimethyl sulfoxide is a very satisfactory solvent for O,O-dimethyl-2,2,2-trichloro-1-hydroxy-ethylphosphonate. Because of its very satisfactory dissolving properties solutions of the organic phosphate of high concentrations may be readily prepared. However, other solvents for the O,O-dimethyl-2,2,2-trichloro-1-hydroxyethylphosphonate may also be utilized. Among these may be mentioned glycols such as propylene glycol, and esters of dibasic acids such as diethyl succinate.

As noted, however, especially for injection purposes in large animals, dimethyl sulfoxide may be the preferred solvent because of the high degree of solubility of the organic phosphate therein. Thus, as an example, we find it more practical to inject large animals with 6 cubic centimeters of an 80 percent solution of O,O-dimethyl-2,2-trichloro-1-hydroxyethylphosphonate in dimethyl sulfoxide, rather than to inject the animal with 24 cubic centimeters of a 20 percent solution of the organic phosphate in propylene glycol.

Since O,O-dimethyl-2,2,2-trichloro-1-hydroxyethylphosphonate is also soluble, to some limited extent, in distilled water and in saline solution, such solvents may occasionally be utilized where high concentrations of the organic phosphate are not required, as for example, in the treatment of small animals such as might be encountered in a veterinarian's practice.

While distilled water is preferred as the solvent for the injectable solution of the atropine, usually in salt form, various other suitable solvents may also be utilized. Practically any aqueous-type solvent is suitable for dissolving a salt of atropine such as atropine sulphate, among may be mentioned saline, propylene glycol and dimethyl sulfoxide. When O,O-dimethyl-2,2,2-trichloro-1-hydroxy-ethylphosphonate and the atropine are both present in the same injectable solution, as when only a single injection of the animal is contemplated, we have found that dimethyl sulfoxide is a satisfactory solvent for both, although other solvents, such as propylene glycol or diethylsuccinate are also suitable.

The injectable pharmaceutical preparation, whether containing both the organic phosphate and atropine, or containing either one alone (when separate injectable solutions are employed), may advantageously include one or more additional agents such as formaldehyde, parabens, benzyl alcohol, chlorobutanol, phenol, metacresol, chlorhexidine or similar agents, which act as preservatives and/or stabilizers. (Chlorhexidine may be chemically identified as 1:6-di (N-p-chlorophenyldiguanido) hexane.) A preservative is used in multi-dose vials in order to prevent contamination when refilling the syringe. The preservative agents, such as chlorhexidine, phenol, the parabens etc., have no affect on either the toxicity or the effectiveness of the drug.

Typical formulations useful as anthelmintic agents in the treatment of dogs, sheep and goats, and in the treatment of swine and cattle, are as follows:

*Composition A*

(For treatment of dogs, cats and goats)

| | Percent |
|---|---|
| O,O - dimethyl-2,2,2-trichloro-1-hydroxyethylphosphonate | 80.00 |
| Atropine sulfate | 0.53 |
| Chlorobutanol | 0.50 |
| Dimethyl sulfoxide, q.s. to 100.00%. | |

*Composition B*

(For treatment of swine, cattle and sheep)

| | Percent |
|---|---|
| O,O - dimethyl-2,2,2-trichloro-1-hydroxyethylphosphonate | 80.00 |
| Atropine sulfate | 1.00 |
| Chlorobutanol | 0.50 |
| Dimethyl sulfoxide, q.s. to 100.00%. | |

*Composition C*

| | Percent |
|---|---|
| O,O - dimethyl-2,2,2-trichloro-1-hydroxyethylphosphonate | 80.00 |
| Atropine sulfate | 1.00 |
| One of the following in the specified percentage: | |
| Chlorobutanol | 0.50 |
| or | |
| Chlorohexidine diacetate | 0.05 |
| or | |
| Formaldehyde | 0.25 |
| or | |
| Benzyl alcohol | 1.50 |
| or | |
| Phenol | 0.05 |
| or | |
| Metacresol | 0.20 |
| or | |
| Mixed, methyl and propyl parabens | 0.15 and 0.018 respectively |
| Dimethyl sulfoxide, q.s. to 100.00%. | |

All percentages are calculated on a weight/volume basis.

It will be noted that these compositions contain both the O,O-dimethyl-2,2,2-trichloro-1-hydroxyethylphosphonate and the atropine, the latter in the form of a soluble salt thereof. They can therefore be used in the single injection technique as an anthelmintic for the animals specified.

These compositions have proven effective in removing the following parasites from the animals listed, the O,O-dimethyl - 2,2,2 - trichloro - 1 - hydroxyethylphosphonate proving to be very effective for the purpose.

TABLE II

*Parasites Removed*

HORSES (1) Large strongyles (3 Strongylus spp.)
(2) Small strongyles (more than 30 Strongylus spp.)
(3) Large round worm (*Parascaris equorum*)
(4) Pinworm (*Oxyuris equi*)
(5) Bots (3 Gastrophilus spp.)

CATTLE, SHEEP AND GOATS (1) Stomach worms (Haemonchus, Ostertagia, and Trichostrongylus supp.)
(2) Nodular worm (Esophagostomum spp.)
(3) Intestinal worms (Cooperia, Nematodirus and Strongyloides spp.)
(4) Hookworms (Bunostomum spp.)
(5) Whipworms (Trichuris spp.)
(6) Grubs (Hypoderma spp. in cattle)
(7) Bots (*Oestrus ovis* in sheep in and goats)

SWINE (1) Nodular worms (Oesophagostomum spp.)
(2) Whipworm (*Trichuris suis*)
(3) Large roundworm (*Ascaris lumbricoides*)

DOGS AND CATS (1) Hookworms (Ancylostomum and Uncinaria spp.)
(2) Whipworms (Trichuris spp.)
(3) Large roundworms (Toxocara and Toxascaris spp.)

While the mode of the anthelmintic action of the organic phosphate against the parasites has not been established, the compound apparently causes muscular paralysis through enzyme interference with the nervous system of the parasite. This is similar to the action of O,O-dimethyl - 2,2,2 - trichloro - 1 - hydroxyethylphosphonate against insects and animals.

Certain animal parasites may be alive when removed by action of the organic phosphate. Ordinarily, however, the O,O - dimethyl - 2,2,2 - trichloro - 1 - hydroxyethylphosphonate kills the parasite. They appear to pass out intact and reduced ova counts in the feces of the animal being treated are attributable to removal of the worms.

Among parasites, the strongyloids represent the most difficult to remove, the most important parasites from the veterinary point of view, the most frequently encountered and the most numerous. Until O,O - dimethyl - 2,2,2 - trichloro - 1 - hydroxyethylphosphonate became available and was utilized in accordance with our invention, there had been available no really effective anthelmintic against both the large and small strongyles in animals such as horses.

As a brief summary giving the results of treating various animals, by injection, with the organic phosphate, for comparison purposes both when the O,O-dimethyl-2,2,2-trichloro - 1 - hydroxyethylphosphonate was utilized alone, and in conjunction with atropine, the following table is submitted. This gives the species of animal treated, the dosage of the organic phosphate, the ratio of atropine (as atropine sulfate) by weight to the O,O-dimethyl - 2,2,2 - trichloro - 1 - hydroxyethylphosphonate utilized in the treatment, and the observed side effects of the drug on the animals. In the concluding column there is given an optimum ratio of atropine to the organic phosphate at a dosage of 100 milligrams per kilogram of body weight, as determined from the test results.

tions although no deaths resulted. Administration of the organic phosphate orally along with an anticholinergic, atropine sulfate, gave excellent results, the internal parasites being effectively removed from the dogs. Dosages of O,O - dimethyl - 2,2,2 - trichloro - 1 - hydroxyethylphosphonate equivalent to 125 milligrams per kilogram of body weight administered orally, are well tolerated by animals such as dogs and pigs. Such oral doses, at 125 mg. per kg., are effective against ascarids, nodular worms and whipworms in pigs.

It may also be noted that injectable solutions of O,O-dimethyl - 2,2,2 - trichloro - 1 - hydroxyethylphosphonate are consistently effective at a lower dosage in swine than in dogs.

In accordance with our invention, wherein the animals are treated, by injection, with a solution of O,O-dimethyl-2,2,2 - trichloro - 1 - hydroxyethylphosphonate, ordinarily only one treatment is necessary. The desirable dosage of the organic phosphate utilized may vary from about 25 milligrams per kilogram of body weight to 125 milligrams per kilogram of body weight, or even higher. The dosage selected will depend, to some extent, on the animal

TABLE III

| Species | Dosage of O,O-dimethyl-2,2,2-trichloro-1-hydroxyethyl phosphate | No. of animals treated | Atropine: O,O-dimethyl-2,2,2-trichloro-1-hydroxyethyl phosphate Ratio | Observed Side Effects | | | | Probable Optimum Ratio at 100 mg./kg. Dosage |
|---|---|---|---|---|---|---|---|---|
| | | | | Death | Severe | Mild | None | |
| Cats | 60-80 | 5 | No atropine | 2 | 3 | 0 | 0 | Cats—1:40. |
| Cats | 60-100 | 3 | 1:80, 1:20 | 0 | 1 | 3 | 0 | |
| Dogs | 240 | 2 | No atropine | 1 | 1 | 0 | 0 | Dogs—1:150. |
| Dogs | 240 | 1 | 1:40 | 0 | 0 | 0 | 1 | |
| Dogs | 80 | 16 | No atropine | 0 | 4 | 12 | 0 | |
| Dogs | 70-100 | 10 | 1:150, 1:80 | 0 | 0 | 0 | 21 | |
| Goats | 100-200 | 6 | No atropine | 2 | 4 | 0 | 0 | Goats—1:150. |
| Goats | 100-200 | 8 | 1:150 | 0 | 0 | 0 | 8 | |
| Goats | 30-80 | 9 | No atropine | 0 | 1 | 2 | 6 | |
| Goats | 30-80 | 8 | 1:150 | 0 | 0 | 0 | 8 | |
| Sheep | 100 | 396 | 1:80 | 0 | 14 | 20 | 362 | Sheep—1:60(?). |
| Sheep | 100 | 20 | 1:40 | 0 | 0 | 0 | 20 | |
| Swine | 75-150 | 8 | No atropine | 0 | 4 | 0 | 0 | Swine—1:80. |
| Swine | 400 | 1 | 1:40 | 0 | 0 | 0 | 1 | |
| Swine | 400 | 1 | 1:80 | 0 | 0 | 1 | 0 | |
| Swine | 100 | 4 | 1:40 | 0 | 0 | 0 | 4 | |
| Swine | 100 | 4 | 1:80 | 0 | 0 | 2 | 2 | |
| Swine | 100 | 6 | 1:150 | 0 | 0 | 6 | 0 | |
| Swine | 25-75 | 15 | 1:40, 1:80, 1:150 | 0 | 0 | 0 | 15 | |

In another evaluation of O,O-dimethyl-2,2,2-trichloro-1-hydroxyethylphosphonate, used both with, and without, atropine (in the form of atropine sulfate), wherein dogs were treated by injection, the following results were observed. In this study, where atropine was used along with the organic phosphate, the atropine solution was injected separately, substantially simultaneously with the administration, by injection, of a dimethyl sulfoxide solution of the O,O-dimethyl-2,2,2-trichloro-1-hydroxyethylphosphonate drug.

TABLE IV

| Dosage of O,O-Dimethyl-2,2,2-trichloro-1-hydroxyethyl-phosphonate administered by injection to the dogs | No. of dogs | Atropine sulfate (1.80, by weight) included | Observed side effects (number of dogs) | | |
|---|---|---|---|---|---|
| | | | None | Moderate | Severe |
| 100 mg. per kilo of body weight | 5 | Yes | 5 | 0 | 0 |
| 80 mg. per kilo of body weight | 16 | No | 0 | 12 | 4 |

These results clearly show the advantages of administering atropine to the dogs substantially simultaneously or at about the same time as O,O-dimethyl-2,2,2-trichloro-1-hydroxyethylphosphonate is administered to the dogs.

We have also administered O,O - dimethyl - 2,2,2-trichloro-1-hydroxyethylphosphonate orally to dogs at a dosage level of 500 milligrams of the organic phosphate per kilogram of animal body weight. Administering the compound orally, without administration of an anticholinergic at the same time, resulted in toxic manifestabeing treated and the type of worms being removed. For example, when treating dogs infested with hookworms and ascarids, dosages of 125 milligrams per kilogram, or even higher, may be advantageously employed. Dosages in the treatment of goats have gone as high as 200 milligrams per kilogram and have given excellent results, but equally good results are secured at dosages of 100 milligrams per kilogram of body weight. On the other hand, dosages as low as 25 milligrams per kilogram may be effective against whipworms in swine and bots in horses. For most purposes the optimum dosage of O,O - dimethyl - 2,2,2 - trichloro - 1 - hydroxyethylphosphonate appears to be 100 milligrams of the drug per kilogram of animal body weight.

Occasionally it may be advantageous to repeat the treatment although usually one injection is sufficient. These factors apply both where a single solution containing the organic phosphate and atropine is administered by injection, and where separate solutions of O,O-dimethyl-2,2,2 - trichloro - 1 - hydroxyethyl - phosphonate and atropine are injected. Parasites removed, as well as reduced nematode ova counts in the feces of the animals, are observed with but a single administration of the anthelmintic composition.

As previously explained, the ratio of atropine (calculated as atropine sulfate salt) to the organic phosphate on a weight by weight basis can advantageously be varied from a ratio of 1:20 to a ratio of 1:300. Work done with atropine to organic phosphate ratios of 1:150, 1:80 and 1:40 has given especially satisfactory results.

When the O,O-dimethyl-2,2,2-trichloro-1-hydroxyethylphosphonate and the atropine are administered separately it is advantageous that the two solutions be injected, preferably at different sites, substantially simultaneously. By substantially simultaneously, however, we means that, ordinarily, the two injections should occur within from one-half to two hours of each other. Toxic symptoms resulting from the administration of the organic phosphate usually appear within this time interval, one-half hour to two hours, after the injection. Toxic symptoms can be reversed during this time interval by the injection of the atropine, usually in the form of a soluble atropine salt.

Alternatively animals can be pre-treated by the administration of the atropine several hours prior to the injection of O,O - dimethyl - 2,2,2 - trichloro - 1 - hydroxyethylphosphonate and be protected against toxic symptoms or death. However injection should preferably occur at approximately the same time since the peak action and excretion of O,O - dimethyl - 2,2,2 - trichloro - 1 - hydroxyethylphosphonate and atropine appear to be essentially the same.

Solutions used for injection, or otherwise, to administer O,O - dimethyl - 2,2,2 - trichloro - 1 - hydroxyethylphosphonate would be ordinarily prepared as sterile solutions. Sterilization by heat is not ordinarily successful, and we prefer to sterilize by passing the solution through a sterile filter. Similarly, the solution of atropine may be sterilized by passage through a sterile filter although, under some circumstances, if these solutions do not contain O,O-dimethyl - 2,2,2 - trichloro - 1 - hydroxyethylphosphonate, they can be sterilized by the application of heating.

Various changes and modifications which do not depart from the essentials of our invention, certain preferred embodiments of which have herein been disclosed, may be introduced, and such of these as are within the scope of the appended claims are to be considered as part of our invention.

We claim:

1. The method of removing internal parasites from an animal which comprises injecting into said animal, substantially simultaneously, a solution of O,O-dimethyl-2,2,2-trichloro-1-hydroxyethylphosphonate in amount sufficient to remove said parasites, and a solution of an anticholinergic agent sufficient in amount to antidote the toxic action to said host animal of said O,O-dimethyl-2,2,2-trichloro-1-hydroxyethylphosphonate.

2. The method of removing internal parasites from an animal which comprises injecting into said animal, substantially simultaneously, a solution of O,O-dimethyl-2,2,2-trichloro-1-hydroxyethylphosphonate in amount sufficient to remove said parasites and, in amount sufficient to antidote the toxic action to said host animal of said O,O - dimethyl - 2,2,2 - trichloro - 1 - hydroxyethylphosphonate, a solution of a water-soluble salt of atropine in an aqueous solvent.

3. The method of removing internal parasites from an animal which comprises administering to said animal, by injection, a solution containing both a dose of O,O-dimethyl - 2,2,2 - trichloro - 1 - hydroxyethylphosphonate in amount sufficient to remove said parasites and an anticholinergic agent sufficient in dosage to antidote the toxic effects of said O,O-dimethyl-2,2,2-trichloro-1-hydroxyethylphosphonate on said host animal, said solution of O,O - dimethyl - 2,2,2 - trichloro - 1 - hydroxyethylphosphonate and said anticholinergic agent being administered to said animal substantially simultaneously.

4. A composition for use as an anthelmintic agent in removing internal parasites from animals which comprises a solution containing O,O-dimethyl-2,2,2-trichloro-1-hydroxyethylphosphonate and a soluble salt of atropine.

5. The composition defined in claim 4 wherein the atropine salt is atropine sulfate, and the solvent is one selected from the group which consists of dimethyl sulfoxide, propylene glycol and diethyl succinate.

6. A composition for use as an anthelmintic in removing internal parasites from animals which comprises a solution of O,O - dimethyl - 2,2,2 - trichloro - 1 - hydroxyethylphosphonate, a salt of atropine, and at least one preservative selected from the group which consists of chlorobutanol, chlorhexidine diacetate, formaldehyde, benzyl alcohol, phenol, metacresol, and methyl and propyl parabens.

7. The composition defined in claim 6 wherein the atropine salt is atropine sulfate, and the solvent is one selected from the group which consists of dimethyl sulfoxide, propylene glycol and diethyl succinate.

8. A composition for use in treating animals infested with internal parasites, which composition comprises 80.00 percent of O,O - dimethyl - 2,2,2 - trichloro - 1 - hydroxyethylphosphonate; 0.53 percent of atropine sulfate 0.50 percent of chlorbutanol; and q.s. to 100% of dimethyl sulfoxide; and all percentages being on weight/volume basis.

9. A composition for use in treating animals infested with internal parasites, which composition comprises 80.00 percent of O,O - dimethyl - 2,2,2 - trichloro - 1 - hydroxyethylphosphonate; 1.00 percent of atropine sulfate; 0.50 percent of chlorbutanol and q.s. to 100% of dimethyl sulfoxide; and all percentages being on weight/volume basis.

10. A composition useful for treating, by injection, animals infested with internal parasites, said composition comprising a substantially sterile solution containing, in a solvent selected from the group consisting of dimethyl sulfoxide, propylene glycol and diethyl succinate, the following ingredients in the specified percentages by weight, based on the total weight of said composition:

| | Percent |
|---|---|
| O,O - dimethyl - 2,2,2 - trichloro - 1 - hydroxyethylphosphonate | 80.0 |
| A salt of atropine | 1.0 |
| One, or more of the following in the percentage specified: | |
| Chlorobutanol | 0.5 |
| Chlorhexidine diacetate | 0.05 |
| Formaldehyde | 0.25 |
| Benzyl alcohol | 1.50 |
| Phenol | 0.05 |
| Metacresol | 0.20 |
| Methyl paraben | 0.15 |
| Propyl paraben | 0.018 |

11. The composition defined in claim 10 wherein the salt of atropine is atropine sulfate.

12. An injectable anthelmintic composition comprising an anticholinergic and O,O-dimethyl-2,2,2-trichloro-1-hydroxyethyl-phosphonate.

13. An injectable anthelmintic composition comprising an anticholinergic and O,O-dimethyl-2,2,2-trichloro-1-hydroxyethyl-phosphonate in a solvent selected from the group which consists of dimethyl sulfoxide, propylene glycol, and diethyl succinate.

14. In combination, for treating animals infested with internal parasites, a composition containing both an anticholinergic compound and O,O-dimethyl-2,2,2-trichloro-1-hydroxyethylphosphonate.

15. A composition for use as an anthelmintic agent in removing internal parasites from animals which comprises a solution containing O,O-dimethyl-2,2,2-trichloro-1-hydroxyethylphosphonate and atropine.

16. A composition useful for treating, by injection, animals infested with internal parasites, said composition comprising a substantially sterile solution containing, in a solvent selected from the group consisting of dimethyl sulfoxide, propylene glycol and diethyl succinate, the following ingredients of the specified percentages by weight, based on the total weight of said composition:

| | Percent |
|---|---|
| O,O - dimethyl - 2,2,2 - trichloro - 1 - hydroxyethylphosphonate | 80.0 |
| A salt of atropine | 0.1–2.5 |
| One, or more, of the following in the percentage specified: | |
| Chlorobutanol | 0.5 |
| Chlorhexidine diacetate | 0.05 |
| Formaldehyde | 0.25 |
| Benzyl alcohol | 1.50 |
| Phenol | 0.05 |
| Metacresol | 0.20 |
| Methyl paraben | 0.15 |
| Propyl paraben | 0.018 |

References Cited in the file of this patent

UNITED STATES PATENTS 2,701,225    Lorenz    Feb. 1, 1955

OTHER REFERENCES

Hazleton: Agricultural and Food Chemistry, vol. 3, No. 4, April 1955, pages 312–314.

McGregor: J. of Economic Entomology, vol. 47, No. 3, June 1954, pages 465–467.

UNITED STATES PATENT OFFICE
CERTIFICATE OF CORRECTION

Patent No. 3,067,096            December 4, 1962

James C. Trace et al.

It is hereby certified that error appears in the above numbered patent requiring correction and that the said Letters Patent should read as corrected below.

Column 1, lines 35 to 38, the formula should appear as shown below instead of as in the patent:

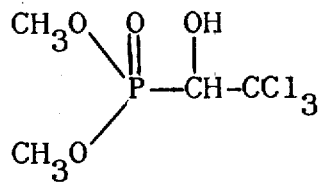

column 4, line 12, for "-hydroxyethylphosphone" read -- -hydroxyethylphosphonate --; line 74, for "-hydroxymethylphosphonate" read -- -hydroxyethylphosphonate --.

Signed and sealed this 18th day of June 1963.

(SEAL)
Attest:

ERNEST W. SWIDER            DAVID L. LADD
Attesting Officer            Commissioner of Patents